United States Patent
Tiefenbock et al.

(10) Patent No.: US 9,925,597 B2
(45) Date of Patent: *Mar. 27, 2018

(54) CHUCK ADAPTED FOR AUTOMATED COUPLING

(71) Applicant: EV Group GmbH, St. Florian am Inn (AT)

(72) Inventors: Wolfgang Tiefenbock, Windorf (DE); Herbert Tiefenbock, Andorf (AT)

(73) Assignee: EV Group GmbH, St. Florian am Inn (AT)

( * ) Notice: Subject to any disclaimer, the term of this patent is extended or adjusted under 35 U.S.C. 154(b) by 0 days.

This patent is subject to a terminal disclaimer.

(21) Appl. No.: 15/382,995

(22) Filed: Dec. 19, 2016

(65) Prior Publication Data

US 2017/0100780 A1 Apr. 13, 2017

Related U.S. Application Data

(63) Continuation of application No. 13/818,414, filed as application No. PCT/EP2011/063896 on Aug. 12, 2011, now Pat. No. 9,555,479.

(30) Foreign Application Priority Data

Aug. 23, 2010 (DE) .......................... 10 2010 035 150

(51) Int. Cl.
*B23B 31/26* (2006.01)
*B23B 31/16* (2006.01)
(Continued)

(52) U.S. Cl.
CPC ........ *B23B 31/26* (2013.01); *B23B 31/16116* (2013.01); *B23B 31/39* (2013.01);
(Continued)

(58) Field of Classification Search
CPC ........ B23B 31/16004; B23B 31/16037; B23B 31/16079; B23B 31/39; B23B 31/24;
(Continued)

(56) References Cited

U.S. PATENT DOCUMENTS 1,595,964 A 8/1926 Horton .......................... 279/114
1,831,225 A 11/1931 Bogart .......................... 279/114
(Continued)

FOREIGN PATENT DOCUMENTS

CN 1217676 A 5/1999 ........... B23B 31/163
CN 1370647 A 9/2002 ............. B23B 31/02
(Continued)

OTHER PUBLICATIONS

Machine translation, Japan patent document, JPH0666326A, "Shaft Joint Mechanism", Ezawa, N. et al., Mar. 1994.*
(Continued)

*Primary Examiner* — Eric A Gates
*Assistant Examiner* — Chwen-Wei Su
(74) *Attorney, Agent, or Firm* — Kusner & Jaffe

(57) ABSTRACT

A chuck for clamping workpieces or tools in a clamping space with a clamping force (F). The chuck includes at least two chuck jaws movable in translation along one clamping plane (E) in the direction of one center Z of the clamping space and a gear train located at least largely within the chuck for transfer of a driving torque of a drive motor, which can be coupled to the gear train by coupling means of the gear train, to the chuck jaws for movement of the chuck jaws. The coupling means able to be coupled to a corresponding coupling connection of the drive motor. The movement from the maximum size of the clamping space to the minimum size of the clamping space is executed via the gear train from the drive motor.

18 Claims, 2 Drawing Sheets

(51) Int. Cl.
  *B23B 31/39* (2006.01)
  *B23B 31/24* (2006.01)
  *B23B 31/163* (2006.01)

(52) U.S. Cl.
  CPC ... *B23B 31/16037* (2013.01); *B23B 31/16079* (2013.01); *B23B 31/24* (2013.01); *B23B 2231/42* (2013.01); *Y10S 279/901* (2013.01); *Y10T 279/19* (2015.01); *Y10T 279/27* (2015.01)

(58) Field of Classification Search
  CPC . B23B 2270/12; B23B 31/26; B23B 2231/42; Y10T 279/27; Y10T 279/19; Y10T 279/1926; Y10S 279/901
  See application file for complete search history.

(56) References Cited

U.S. PATENT DOCUMENTS

| | | | | |
|---|---|---|---|---|
| 2,006,621 | A | 7/1935 | Berg | 279/135 |
| 2,358,049 | A | 9/1944 | Bogart | 279/114 |
| 2,399,622 | A | 5/1946 | Bogart | 279/114 |
| 3,499,657 | A | 3/1970 | Giraud et al. | 279/114 |
| 4,254,676 | A | 3/1981 | Wilson | 82/152 |
| 4,536,000 | A | 8/1985 | Rohm | 279/126 |
| 4,550,922 | A | 11/1985 | Hall et al. | 279/119 |
| 4,647,051 | A | 3/1987 | Stone et al. | 279/1 |
| 6,079,303 | A | 6/2000 | Lyachovitsky | 82/165 |
| 6,139,028 | A | 10/2000 | Kosho | 279/114 |
| 6,463,835 | B1 | 10/2002 | Segawa et al. | 82/1.11 |
| 6,629,697 | B1 | 10/2003 | Asai | 279/110 |
| 6,973,714 | B2 * | 12/2005 | Isogai | B23Q 17/005 269/71 |
| 7,674,217 | B2 | 3/2010 | Kawai | 483/20 |
| 8,678,269 | B2 | 3/2014 | Chaumat et al. | 228/121 |
| 9,103,741 | B2 | 8/2015 | Baik et al. | G01M 5/0016 |
| 2009/0233775 | A1 | 9/2009 | Kawai et al. | 483/46 |
| 2011/0006490 | A1 | 1/2011 | Puppala et al. | 279/126 |
| 2014/0186102 | A1 | 7/2014 | Chaumat et al. | 403/272 |

FOREIGN PATENT DOCUMENTS

| | | | |
|---|---|---|---|
| CN | 1817530 A | 8/2006 | B23B 31/02 |
| CN | 201033361 Y | 3/2008 | B23B 31/10 |
| DE | 35 00 002 | 8/1985 | B23B 31/16 |
| DE | 38 20 871 | 2/1989 | B23Q 16/02 |
| EP | 0 218 756 | 8/1985 | B23Q 3/12 |
| JP | 52-146776 | 11/1977 | B23B 31/16 |
| JP | S52-146776 U | 11/1977 | B23B 31/16 |
| JP | S59-97884 A | 6/1984 | B25J 13/08 |
| JP | 4-20 | 1/1992 | F16D 23/06 |
| JP | H06-66326 A | 3/1994 | B25J 17/02 |
| JP | 10-96436 | 4/1998 | F16D 13/08 |
| JP | H11-188513 A | 7/1999 | B23B 31/02 |
| JP | 2000-190113 A | 7/2000 | B23B 31/163 |
| JP | 2001-225215 A | 8/2001 | B23B 13/02 |
| JP | 2012-47177 | 3/2012 | F01D 25/00 |
| JP | 2013-525236 | 6/2013 | B22F 9/00 |
| SU | 1199475 A | 12/1985 | B23B 31/24 |
| SU | 1463401 A1 | 3/1989 | B23B 31/14 |
| WO | WO 99/51380 | 10/1999 | B23B 31/16 |

OTHER PUBLICATIONS

International Search Report for International Application No. PCT/EP2011/063896, dated Dec. 6, 2011.

Office Action issued in connection with corresponding Japanese Patent Application No. 2013-525236, dated Nov. 27, 2014.

Office Action issued in connection with corresponding Korean Patent Application No. 10-2013-7003214, dated Nov. 27, 2014.

\* cited by examiner

CHUCK ADAPTED FOR AUTOMATED COUPLING

RELATED APPLICATIONS

The present application is a continuation of U.S. application Ser. No. 13/818,414, filed Feb. 22, 2013, which is a U.S. National Stage Application of International Application No. PCT/EP2011/063896, filed Aug. 12, 2011, which claims priority from German Patent Application No. 10 2010 035 150.4, filed Aug. 23, 2010, said patent applications hereby fully incorporated herein by reference.

FIELD OF THE INVENTION

This invention relates to a chuck for clamping of workpieces or tools in a clamping space with a clamping force F and a system comprised of this chuck and the drive motor.

BACKGROUND OF THE INVENTION

Chucks are used in tool technology, especially in turning and milling for holding various workpieces or tools in the clamping space which is formed by the jaws of the chuck. Tools can be for example milling heads or drills which are stored in magazines and removed from the respective magazine by automation and clamped in the chuck in a computer controlled manner in order for example to be able to carry out different process steps on the same component.

In particular for chucks which are not hydraulically or pneumatically driven it is necessary at regular intervals to replace the chuck, for example when the chuck is no longer working with the necessary precision or the dimension of the chuck is not suitable for use. In the chuck, tools or machine components or the workpiece to be machined are clamped in the center of the lathe chuck in a clamping space which is formed by the faces of the chuck jaws.

For example, hydraulic and pneumatic chucks have the advantage that they can be automatically and quickly switched. The chucking travels of the chuck jaws which can be achieved with hydraulic and pneumatic chucks are comparatively small, for example only +/−10 mm so that the smallest and largest diameter of the clamping space which stands for the variability of the chuck is limited. In any case, the chuck can accommodate large tools or workpieces by re-arranging or replacing the chuck jaws.

For this reason the attainable clamping force for these chucks is very great. In order to therefore be able to accommodate tools or workpieces with different dimensions, especially a different diameter, either the chuck must be replaced or the chuck jaws must be shifted.

Chucks are for example head chucks, drill chucks, lathe chucks or shrink chucks.

Moreover the replacement of chucks generally takes place manually, a specialist stopping the machine tool, opening it and opening the jaws of the chuck, removing the workpiece and then replacing the chuck by a new chuck.

Therefore the object of this invention is to provide a chuck which can be used more efficiently, in particular which reaches high clamping force, and which has wide chuck travels and at the same time a construction as compact as possible.

SUMMARY OF THE INVENTION

The technical problem underlying the invention is solved with the features of the independent claim(s). Advantageous developments of the invention are given in the dependent claims. All combinations of at least two of the features given in the specification, the claims and/or the figures also fall within the scope of the invention. At given value ranges, values within the indicated limits will also be considered to be disclosed as boundary values and will be claimed in any combination.

The invention is based on the idea of designing the chuck, especially by removing dynamometer means and/or displacement measuring means and/or other electrical components which determine the state of the chuck, such that the chuck is made on the one hand to be replaceable in an automated manner or is used solely for transfer of the driving torque from the drive motor to the chuck jaws. Another design approach which is intended alternatively or cumulatively thereto is that a movement from the maximum size of the clamping space to the minimum size of the clamping space can be carried out by a gear train which has been displaced into the interior of the chuck and a drive motor which can be connected to it automatically solely by the drive motor and the movement of the chuck jaws which is executed by the drive motor via the gear train. The chuck can thus be used more flexibly for a larger number of workpieces.

In particular it is provided that the gear train between the drive motor and a chuck jaw drive which directly drives the chuck jaws, especially a spiral ring, is made purely mechanical and/or purely positive. In addition a hydraulic or pneumatic drive can be provided on the chuck jaw drive in addition for precision adjustment of the chuck jaws or each chuck jaw. The additional drive is especially advantageous for small positioning travels of the chuck jaws while the gear train with its chuck jaw drive is intended for comparatively large positioning travels of at least 1 cm, especially at least 2 cm, preferably at least 5 cm.

The clamping space is defined by the number of chuck jaws and is used to accommodate workpieces and/or tools with a different outside contour in a clamping section of the tools/workpieces. Generally the clamping section is provided as a polygonal cylinder section on one clamping end of the workpiece/tool. The chuck jaws clamp the tool/workpiece on the jacket surface of the clamping section by the chuck jaws with the clamping force F provided by the drive motor pressing from at least two, generally three or four sides on the jacket surface, as a result of which adhesion arises between the chuck and the tool/workpiece.

It is provided as claimed in the invention that the chuck jaws can be moved by translation along the clamping plane E from a maximum position to a minimum position of the chuck jaw on the respective chuck by a drive which is provided especially integrally on each chuck jaw, especially guide grooves, so that transfer of the chuck jaw, as is necessary for example in hydraulically or pneumatically movable chuck jaws, can be omitted. The chuck jaws can therefore be moved without transfer over the entire chucking travel provided by the chuck jaws on the respective chuck.

By removing functional parts which have been implied to date in chucks, not only are the costs for the chuck reduced, but the operation of the chuck can be reduced to the essential, specifically precise clamping and fixing of workpieces or tools to secure the chuck against displacement and/or rotation.

This invention is especially suited for lathe chucks or milling chucks.

According to one embodiment of the invention it is especially advantageous if the chuck is made purely mechanical since on the one hand this simplifies the production of the chuck and increases the reliability of the chuck.

By an opening width D being adjustable between at least two of the chuck jaws and/or by the clamping force F being directly adjustable by the drive motor which is made especially as a servomotor, the control/adjustment of the chuck when clamping workpieces or tools is accomplished directly by the drive motor without the need for additional sensors or measurement means. The drive motor can be especially torque-controlled and/or position-controlled, a calibration of the servomotor and of the closed control loop present in the servomotor to the respective chuck being necessary. In this way especially simple, efficient and very accurate control/adjustment of the chuck is possible.

According to one advantageous embodiment of the invention, it is provided that there is a clamping space on the front of the chuck and there are coupling means on the back of the chuck facing away from the front. This configuration facilitates the changing and use of the chuck and enables a space-saving construction.

To the extent the coupling means has an especially elastically mounted splined shaft with a coupling element which acts positively and which lies on the back, especially an internal tooth system which is provided on the drive side of the splined shaft, for positive engagement with a corresponding coupling element of a drive motor shaft, the coupling is enabled by placing the chuck on the corresponding coupling element.

According to another advantageous embodiment of the invention it is provided that the coupling means have mechanical alignment means for automatic alignment when the chuck is coupled to the drive motor, especially in the form of at least one, preferably one especially peripherally closed and/or ring-shaped approach bevel which surrounds the splined shaft. The coupling process becomes more reliable and the coupling element as well as the corresponding coupling element are protected by this measure.

By the drive motor shaft being elastically mounted, when the coupling element is shifted with the corresponding coupling element coupling can take place after the start of the drive motor by the shifting between the coupling element and the corresponding coupling element being released by the movement of the drive and by the corresponding coupling element engaging the coupling element by the spring force.

As claimed in the invention, according to one embodiment it is moreover provided that the gear train has at least two shafts with one drive side and one output side each. Furthermore it is advantageously conceivable that at least two of the shafts have one direction of rotation which is aligned differently, especially orthogonally, to one another. According to one other embodiment of the invention it is provided that at least one of the shafts, especially the drive shaft, runs parallel to one longitudinal axis L of the chuck, especially coincides with it.

Other advantages, features and details of the invention will become apparent from the following description of preferred exemplary embodiments and using the drawings.

BRIEF DESCRIPTION OF THE DRAWINGS

The same components or components with same action are provided with the same reference numbers in the figures.

DETAILED DESCRIPTION OF THE INVENTION

Figure 1:
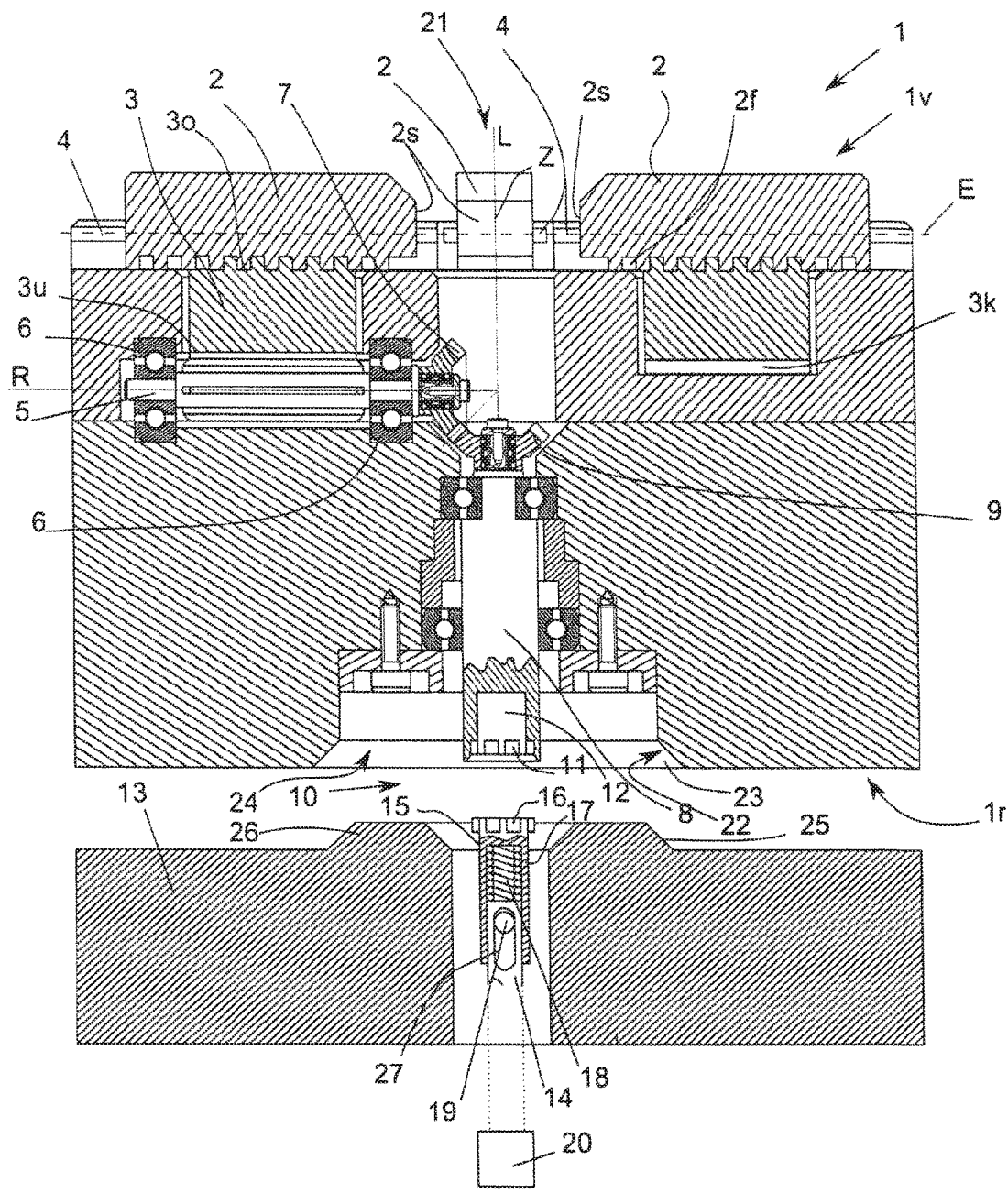
FIG. 1 shows a sectional view of a first embodiment of a chuck as claimed in the invention and a chuck receiver and
FIG. 2 shows a second embodiment of a chuck as claimed in the invention and a chuck receiver.

FIG. 1 top shows a chuck 1 which can be accommodated on a chuck receiver 13 which is shown underneath in order to couple the chuck 1 to a drive motor 20 which is connected to the shaft.

On its front 1v the chuck 1 has several chuck jaws 2 which can be moved linearly or in translation along a clamping plane E by a spiral ring 3 which is located underneath the chuck jaws 2. The spiral ring 3 with a spiral 3s which is located on its surface 3o engages corresponding guide grooves 2f of the chuck jaws. The chuck jaws 2 are linearly guided by linear guides 4.

On a bottom 3u of the spiral ring 3 is a crown tooth system 3k which extends over the entire periphery of the spiral ring 3 on its bottom 3u. The crown tooth system 3k of the spiral ring 3 is a component of a purely mechanical gear train for transfer of a driving torque of the drive motor 20 which can be coupled to the gear train to the chuck jaws 2. Furthermore a component of the gear train is a splined shaft 5 which acts as an output shaft and which engages the crown tooth system 3k of the spiral ring 3 in order to set the spiral ring 3 into rotation. The chuck jaws 2 are uniformly moved in translation by the rotation of the spiral ring 3.

On the drive side the splined shaft 5 has a bevel gear 7 and the splined shaft 5 is mounted in a ball bearing 6; this constitutes the ideal manner of mounting. There are simpler versions as bearings or friction bearings. The axis R of rotation of the splined shaft 5 is parallel to the clamping plane E and via another bevel gear 9 of a drive shaft 8, which gear engages the bevel gear 7 of the splined shaft 5, the rotary drive motion is transformed into one longitudinal axis L of the chuck 1, which axis in this embodiment is orthogonal to the axis R of rotation or to the clamping plane E and moreover lies in the center of the chuck 1 which here coincides with the center Z of the clamping space 21. The axis of rotation of the drive shaft 8 coincides with the longitudinal axis L.

The drive shaft 8 is in turn ball-mounted and on the drive side has an internal tooth system 11 which is provided in a hole 12 and which is located in the interior of the chuck 1.

The drive shaft 8 on the drive sides ends in a recess 24 which is used at least partially as alignment means 22 for automatic alignment when the chuck 1 is coupled to the drive motor 20 or the chuck receiver 13. To do this, there is a ring-shaped approach bevel 23 which surrounds the drive shaft 8 and which acts as alignment means 22 during coupling with a corresponding ring-shaped approach bevel 25 of a projection 26 in the form of a tongue-in-groove connection.

A coupling 10 between the chuck 1 and the drive motor 20 or the chuck receiver 13 has not only the internal tooth system 11 which is provided in the hole 12, but also a head tooth system 16 which is provided on one coupling element 15, both of which are provided on the motor shaft 14. Furthermore, the motor shaft 14 as a coupling connection in addition to the coupling element 15 and the head tooth system 16 has a sleeve 17 on which there is a head tooth system 16 and which is used as a coupling element 15. In the sleeve 17 a helical spring 18 is guided against whose spring force the motor shaft 14 is supported. The maximum movement of the sleeve 17 relative to the motor shaft 14 is limited by a pin 19 which is guided in a slot 27.

The motor shaft 14 is driven by the servomotor 20.

The servomotor 20 thus on the one hand drives the motor shaft 14 via the coupling 10, the drive shaft 8 and the splined shaft 5 coupled to it and thus the spiral ring 3 as well as the chuck jaws 2. On the other hand, the current and voltage can be continuously read out via the servomotor so that for resistance on the chuck jaws 2 by a workpiece, via the output of the servomotor 20 or the change of the current curve and/or voltage curve, control/adjustment of the clamping force F is enabled after prior calibration of the servomotor 20 to the chuck 1. Instead of a servomotor 20, a drive motor can also be used which has mechanical/electrical feedback.

Figure 2:
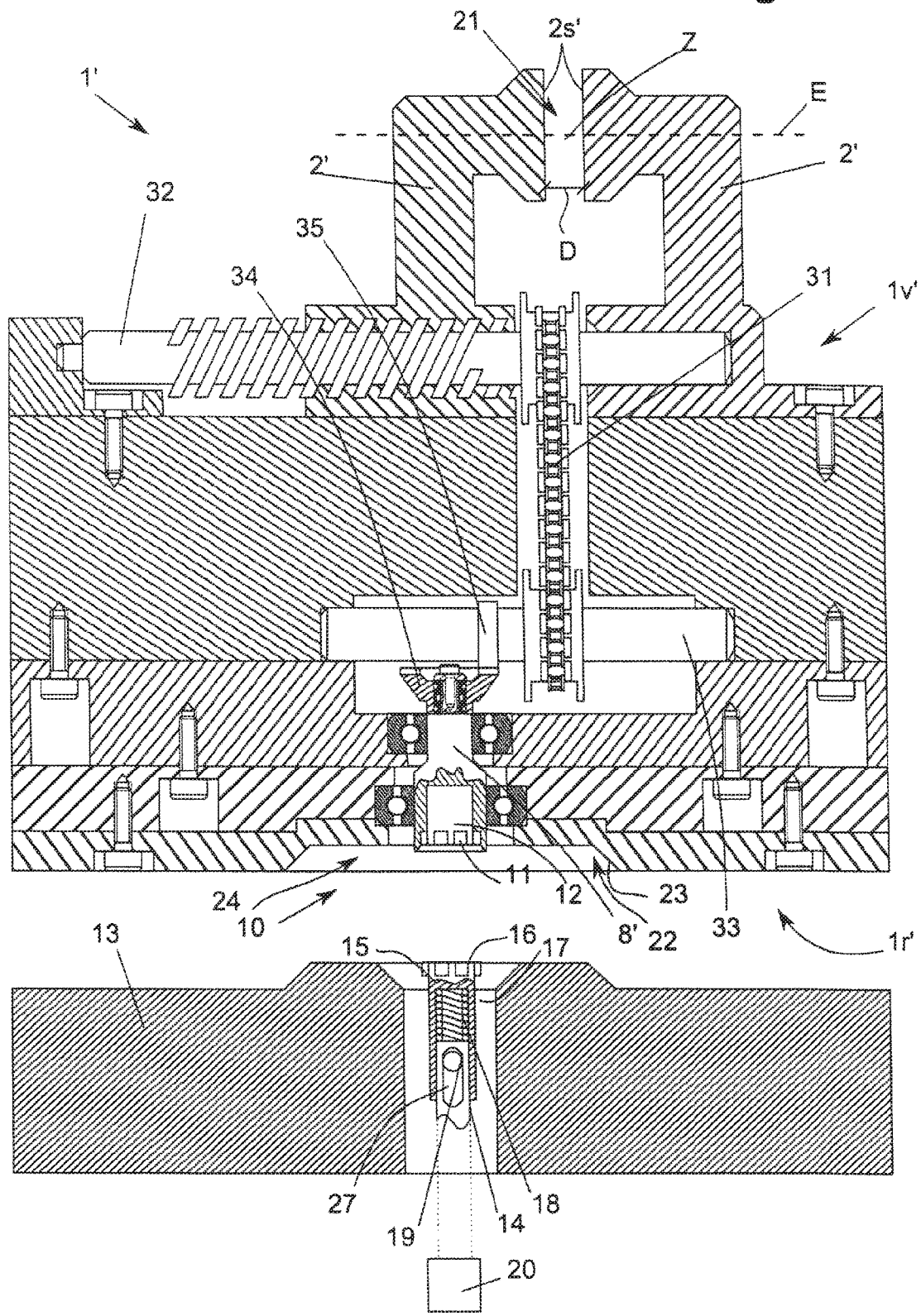

FIG. 2 shows a chuck 1' of a vise which has two jaws 2' between whose faces 2s' and the opening width D the clamping space 21 is formed in which workpieces can be clamped. A translational movement of the jaws 2' along the clamping plane E takes place via a spindle 32 which on the output side translationally moves one of the two chuck jaws 2' as soon as the spindle 32 rotates. The rotation of the spindle 32 takes place on the output side by a chain drive 31 which is coupled to the spindle 32, the chain drive 31 on the drive side being driven by a shaft 33. The shaft 33 is in turn driven by a bevel gear 34 on a gear 35 of the shaft 33. The bevel gear 34 is located on the output side on a drive shaft 8' which is made on the drive side analogously to the embodiment shown in FIG. 1.

The chuck receiver 13 and the drive motor 20 as well as the coupling 10 are made identical to the ones in the first embodiment.

It is moreover common to the two embodiments as shown in FIGS. 1 and 2 that the outside contours of the chuck receiver 13 and of the chuck 1 are flush so that it can be immediately recognized from the outside when the chuck 1 is not sitting correctly on the chuck receiver 13.

In particular a robot arm is suitable for replacement of the chuck 1.

REFERENCE NUMBER LIST 1, 1' chuck
1v, 1v' front
1r, 1r' back
2, 2' chuck jaw
2s, 2s' face
2f guide grooves
3 spiral ring
3o top
3k crown tooth system
3s spiral
4 linear guides
5 splined shaft
6 ball bearing
7 bevel gear
8, 8' drive shaft
9 bevel gear
10 coupling
11 internal tooth system
12 hole
13 chuck receiver
14 motor shaft
15 coupling element
16 head tooth system
17 sleeve
18 spring
19 pin
20 servomotor
21 clamping space
22 alignment means
23 approach bevel
24 recesses
25 approach bevel
26 projection
27 slot
31 chain drive
32 spindle
33 shaft
34 bevel gear
35 gear
E clamping plane
F clamping force
D opening width
Z center
R axis of rotation
L longitudinal axis Having described the invention, the following is claimed:

1. A chuck for clamping of workpieces or tools in a clamping space with a clamping force, the chuck comprising:
    at least two chuck jaws moveable in translation along a clamping plane in a direction of a center of the clamping space, the clamping space defined by faces of the chuck jaws; and
    a torque transfer member located at least largely within the chuck for transferring a driving torque produced by a drive member to the at least two chuck jaws for moving the at least two chuck jaws in translation along the clamping plane, the torque transfer member including a coupling means for coupling the torque transfer member to the drive member,
    wherein the clamping space is changeable solely by operation of the drive member via the torque transfer member and movement of the at least two chuck jaws, the at least two chuck jaws moveable between a position defining a clamping space having a maximum size and a position defining a clamping space having a minimum size,
    wherein the coupling means of the torque transfer member is adapted to be coupled and uncoupled to/from a corresponding coupling element of the drive member by an automation device to replace the chuck, and
    wherein an opening width between the at least two chuck jaws and/or the clamping force is directly adjustable by operation of the drive member.

2. The chuck as claimed in claim 1, wherein the torque transfer member is a gear train.

3. The chuck as claimed in claim 2, wherein the chuck is purely mechanical.

4. The chuck as claimed in claim 1, wherein the drive member is a drive motor.

5. The chuck as claimed in claim 4, wherein the drive motor is a servomotor.

6. The chuck as claimed in claim 5, wherein current and voltage can be continuously read out via the servomotor.

7. The chuck as claimed in claim 4, wherein the drive motor is torque-controlled and/or position controlled.

8. The chuck as claimed in claim 1, wherein a clamping space is provided at a front side of the chuck and said coupling means is provided at a back side of the chuck facing away from the front side of the chuck.

9. The chuck as claimed in claim 1, wherein the coupling means of the torque transfer member includes an elastically mounted drive shaft having a coupling element that acts positively and is located at a back side of the chuck, said coupling element of the drive shaft positively engaging with said corresponding coupling element of the drive member.

10. The chuck as claimed in claim 9, wherein the corresponding coupling element of the drive member is a component of a motor shaft.

11. The chuck as claimed in claim 9, wherein the coupling element of the drive shaft is an internal tooth system provided on a drive side of the drive shaft.

12. The chuck as claimed in claim 1, wherein the coupling means of the torque transfer member includes mechanical alignment means for automatic alignment of the torque transfer member and the corresponding coupling element of the drive member when the chuck is coupled to the drive member.

13. The chuck as claimed in claim 12, wherein the coupling means of the torque transfer member includes a drive shaft, and the mechanical alignment means includes at least one peripherally closed and/or ring-shaped approach bevel that surrounds the drive shaft.

14. A replaceable chuck system comprising:
   a chuck receiver that includes a drive member having a coupling element;
   a chuck for clamping of workpieces or tools in a clamping space with a clamping force, wherein the chuck is adapted to be mounted on the chuck receiver, said the chuck comprising:
      at least two chuck jaws movable in translation along a clamping plane in a direction of a center of the clamping space, the clamping space defined by faces of the chuck jaws; and
      a torque transfer member located at least largely within the chuck for transferring a driving torque produced by a drive member to the at least two chuck jaws for moving the at least two chuck jaws in translation along the clamping plane, the torque transfer member including a coupling means for coupling the torque transfer member to the drive member,
   wherein the clamping space is changeable solely by operation of the drive member via the torque transfer member and movement of the at least two chuck jaws, the at least two chuck jaws moveable between a position defining a clamping space having a maximum size and a position defining a clamping space having a minimum size,
   wherein the coupling means of the torque transfer member is adapted to be coupled and uncoupled to/from the coupling element of the drive member by an automation device to replace the chuck, and
   wherein an opening width between the at least two chuck jaws and/or the clamping force is directly adjustable by operation of the drive member; and
   replacement means for replacing the chuck by dismounting the chuck from the chuck receiver and mounting a replacement chuck on the chuck receiver, wherein the coupling means of the chuck automatically couples and uncouples to/from the coupling element of the drive member.

15. The replaceable chuck system as claimed in claim 14, wherein a motor shaft is elastically mounted in the chuck receiver.

16. The replaceable chuck system as claimed in claim 14, wherein the replacement means includes a robot arm.

17. The replaceable chuck system as claimed in claim 14, wherein the torque transfer member is a gear train.

18. The replaceable chuck system as claimed in claim 14, wherein the drive member is a drive motor.

* * * * *